P. R. BRADLEY.
METHOD OF FIREPROOFING AIRCRAFT PARTS.
APPLICATION FILED OCT. 15, 1919.

1,372,478. Patented Mar. 22, 1921.

WITNESSES
H. J. Walker
E. B. Marshall

INVENTOR
Parker R. Bradley
BY
Munn & Co.
ATTORNEYS

UNITED STATES PATENT OFFICE.

PARKER RICHARDSON BRADLEY, OF EAST ORANGE, NEW JERSEY.

METHOD OF FIREPROOFING AIRCRAFT PARTS.

1,372,478.   Specification of Letters Patent.   Patented Mar. 22, 1921.

Application filed October 15, 1919. Serial No. 330,719.

*To all whom it may concern:*

Be it known that I, PARKER R. BRADLEY, a citizen of the United States, and a resident of East Orange, in the county of Essex and State of New Jersey, have invented a new and Improved Method of Fireproofing Aircraft Parts, of which the following is a description.

My invention relates to fire-proofing aircraft parts, and has for its object to provide means for the protection of cloth and other parts of air-craft from carbonization by the excessive heat of a long continuous blaze.

Additional objects of the invention will appear in the following specification in which the preferred form of my invention is disclosed.

In the drawings similar reference characters refer to similar parts in all the figures in which—

Figure 1:
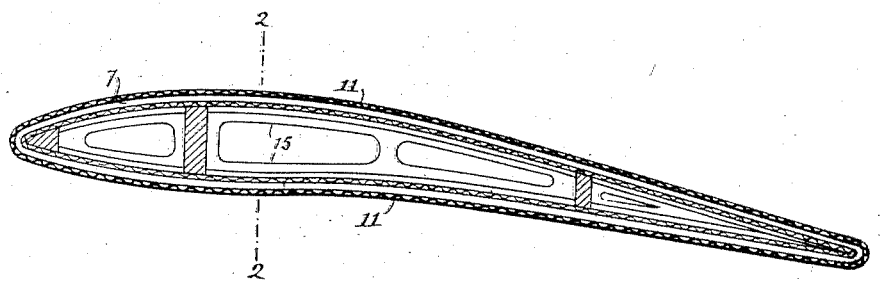
Figure 1 is a sectional view of an air-craft wing.

While the drawings show the invention as applied to a wing of an airplane, it will be understood that the invention is also of value in the construction of rudders, elevators, as well as the fuselage and cock-pit and other parts of air-craft of every description.

In the manufacture of airplanes and other air-craft it has been customary to cover the wings and other parts with one layer of linen, cotton or other fabric, and depend on several coatings of so-called "dope" to contract the cloth to a smooth, drum-like, water-proof surface, and this cloth is not usually fire proof unless fire-proofed by one of my methods such as my alginic acid process described in my application having Serial #224,076, or the process disclosed in my Patent #1309453. It is advisable to apply one of these methods for treating the fabrics when the invention which is the subject matter of the present application is employed.

It has been found that while my said fireproofing processes protect the fabric from fire, they do not protect the fabric as well as desired from being carbonized by the excessive heat of a long, continuous blaze. This is so for while the fire-proof fabric and other parts can not catch fire or burn, nevertheless considerable oil or gasolene may spatter over the fire-proof surface and become ignited and sometimes create excessive heat.

While under ordinary circumstances the ignition of small quantities of oil or gasolene will not carbonize or injure fire-proof surfaces, under exceptional circumstances gasolene or oil may collect, form small puddles on the fireproof surface, and should this become ignited such a great heat is generated that the fabric or other part may be carbonized and thereby weakened where the fire occurs.

It will also be understood that under unusual conditions the fabric or other part of an air-craft may be subjected to a long and fierce heat which may tend to carbonize the fabric or other part. My invention when used avoids this possible danger.

In carrying out my invention I prefer to fire-proof all the wooden parts and also fire-proof the fabric. The fire-proofed cloth is then drawn over the frame which is usually of wood, in the usual manner and fire-proof "dope" is applied and dried.

Several coatings of this "dope" may be used, and metal foil may be employed as set forth in my said Patent #1309453 of July 8, 1919.

When this has been done fire-proofed strips of wood or other material are securely fastened to the outer surfaces of the "doped" cloth, at points where the "doped" cloth contacts with the frame. There is now applied a sheet of asbestos or other fire-proof material and over the outer surfaces of the asbestos sheet a fire-proofed fabric is disposed and is treated with fire-proof "dope" in a manner readily understood by those familiar with the art.

In this manner the inner fabric on the frame is protected by the asbestos sheet and the air spaces, should a fire occur on the outer fabric which is sufficient to carbonize the latter.

By referring to the drawings it will be seen that the usual frame 5 is employed and on this frame 2 there is a fire-proof fabric 6, and which is preferably treated by fire-proof "dope" and may be protected still further by the metal foil referred to.

The strips 7 are disposed on the outer side of the fabric 6, adjacent members of the frame 5 and over this frame which may be in the form of a lattice there is disposed an asbestos sheet 8.

The strips 7 of the lattice form air-spaces 9 between the fabric 6 and the asbestos sheet 8. Over the asbestos sheet 8 there is disposed a fabric 10 which is treated with fire-proof "dope" 11.

Figure 3:
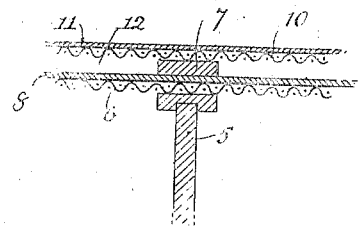
Fig. 3 is a fragmentary sectional view illustrating a modified form of the invention.

In all the modified form of the invention shown in Fig. 3, of the drawings, the asbestos sheet 8 is disposed against the inner fabric 6, and there is an air-space 12 between the asbestos sheet 8 and the outer fabric 10, the strips 7 of the lattice being disposed between the asbestos sheet 8 and the outer fabric 10.

Figure 2:
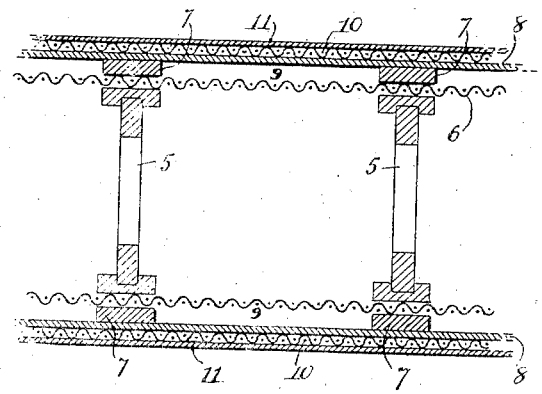
Fig. 2 is an enlarged sectional view on the line 2—2 of Fig. 1.

In other respects the modified form of the invention illustrated in Fig. 3 of the drawings corresponds with the invention as it is illustrated in Figs. 1 and 2.

It will be understood that where the fabrics are drawn tightly around a bend in the frame such as at the edge of the wings of an airplane it is impossible to provide a very great air-space and that therefore it is desirable to apply a much thicker layer of asbestos or other sheet of fire-proof material than is found necessary at other parts of the aircraft member.

My improvement in addition to greatly increasing the fire-resisting quality of the wings and other parts of the air-craft, also increases the strength and lifting power of the wings, and it will also be understood that this double covering permits of the use on the inner fabric, fire-proof "dopes" which will not stand the weather or sun-light, it being possible to make use on the inner fabric a cheap glue or a mixture of glue and shellac, or a "dope" fire-proofed with zinc chlorid or similar substances. It is also possible to treat the inner fabric with a slow-burning "dope" such as the well-known cellulose acetate "dope" but if this should be done, it is extremely important that the outer fabric be treated with a fire-proof "dope."

It will also be understood that it is possible to treat the outer fabric with a slow-burning "dope" and the inner fabric with a fire-proof "dope" but this does not provide the same safety.

The members 7 of the lattice frame may be constructed of wood which is fire-proofed, or may be constructed of asbestos hollow metal or other fire-proof material.

It will be understood that while the invention is above described with reference to its use on air-craft wings that it may also be used in the construction of fuselages rudders, and other parts of air-craft.

Having thus described my invention I claim as new and desire to secure by Letters Patent:—

1. In an air-craft, a frame, a fabric over the frame, a second fabric at the outer surface of the first fabric, and spaced from the latter, a fire-proof sheet between the two fabrics, and means to support the second fabric at a sufficient distance from the first fabric, to provide air-spaces between the fire proof sheet and one of the fabrics and thereby prevent the carbonization of the inner fabric should gasolene burn on the outer fabric.

2. In an air-craft, a non-metallic member, a fabric member, at the outer surface of the first member, and spaced from the latter, a fire-proof sheet between the two members and means to support the second member at a sufficient distance from the first member to provide air-spaces between the fire-proof sheet and one of the members and thereby prevent the carbonization of the non-metallic member should gasolene burn on the fabric member.

3. In an air-craft a member, a fabric member spaced from the first member, a fire-proof sheet disposed between the two members, and strips between the fire-proof sheet and one of the members to provide air-spaces and thereby prevent the carbonization of the fabric member should gasolene burn on the first-mentioned member.

4. In an air-craft, a frame, a fabric disposed over the frame, a second fabric at the outer surface of the first fabric, a fire-proof sheet disposed between the two fabrics, and strips adjacent portions of the frame for holding one of the fabrics spaced from the asbestos sheet and thereby prevent the carbonization of the first fabric should gasolene burn on the second fabric.

5. In an air-craft, a non-metallic member, a fire-proof fabric member at the outer surface of the first member, and means to hold the second member spaced from the first member and thereby prevent the carbonization of the non-metallic member should gasolene burn on the second-mentioned member.

6. In an air-craft, a non-metallic member, a fire-proof fabric member at the outer surface of the first member, a fire-proof sheet disposed between the two members, and means to hold one of the members spaced from the fire-proof sheet.

7. In an air-craft, a non-metallic member, a second member at the outer surface of the first member, and spaced from the latter, a fire-proof sheet between the two members and means to support the second member at a sufficient distance from the first member, to provide air spaces between the fire-proof sheet and one of the members and thereby prevent the carbonization of the non-metallic member should gasolene burn on the second-mentioned member.

8. In an air-craft, a fire proof fabric member, a second fire-proof member at the outer surface of the first member, and spaced from the latter, a fire-proof sheet between the two members and means to support the second member at a sufficient distance from the first member to provide air spaces between the fire-proof sheet and one of the members and thereby prevent the carbonization of the fabric member should gasolene burn on the second-mentioned member.

9. In an air-craft, a fire-proof fabric member, a second fire-proof member at the outer surface of the first fire-proof member and an asbestos sheet disposed between the two fire-proof members and thereby prevent the carbonization of the fabric member should gasolene burn on the second-mentioned member.

PARKER RICHARDSON BRADLEY.